Nov. 27, 1951  N. B. MILTON  2,576,351
TRACTOR MOUNTED DISK CULTIVATOR
Filed Oct. 27, 1947  2 SHEETS—SHEET 1
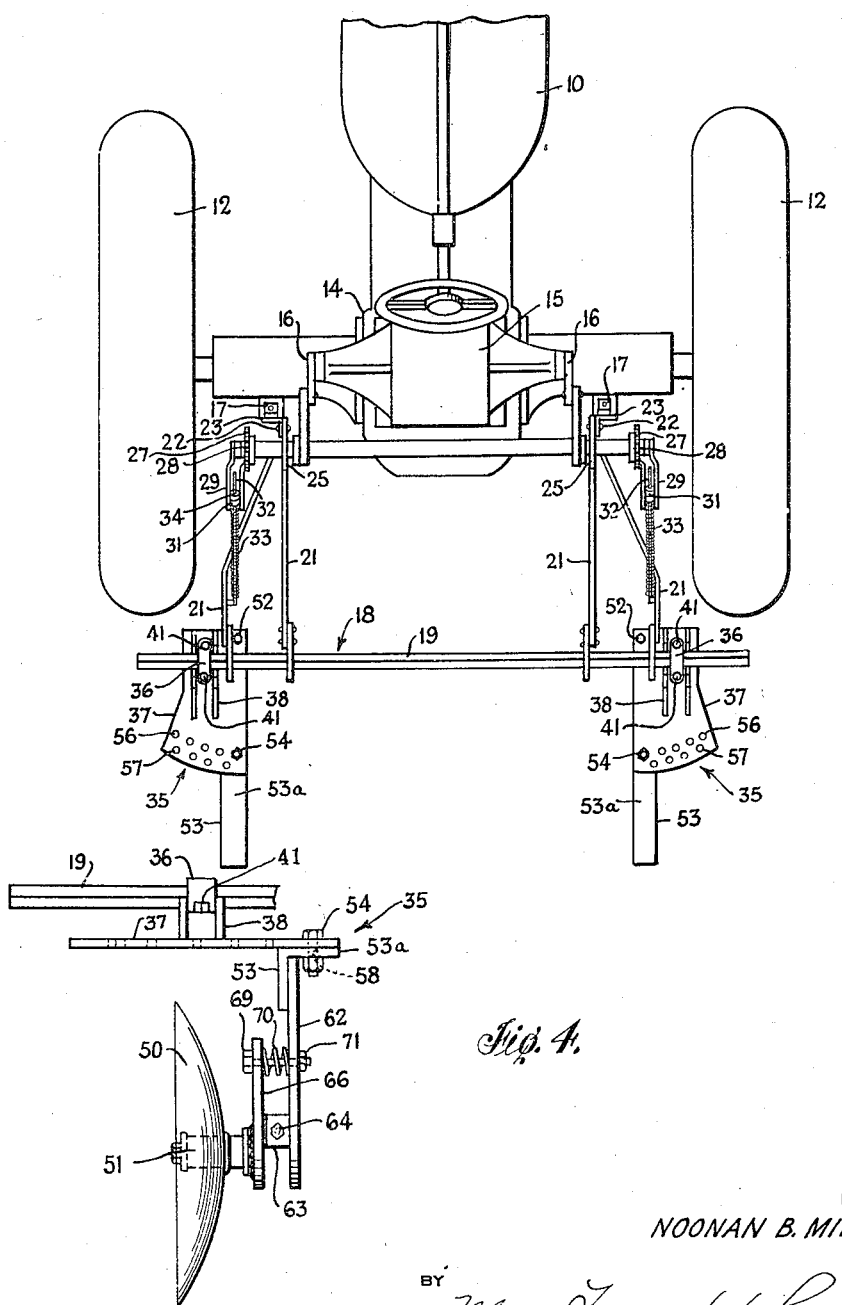
INVENTOR
NOONAN B. MILTON
BY
Mason, Fenwick & Lawrence
ATTORNEYS Nov. 27, 1951  N. B. MILTON  2,576,351
TRACTOR MOUNTED DISK CULTIVATOR
Filed Oct. 27, 1947  2 SHEETS—SHEET 2
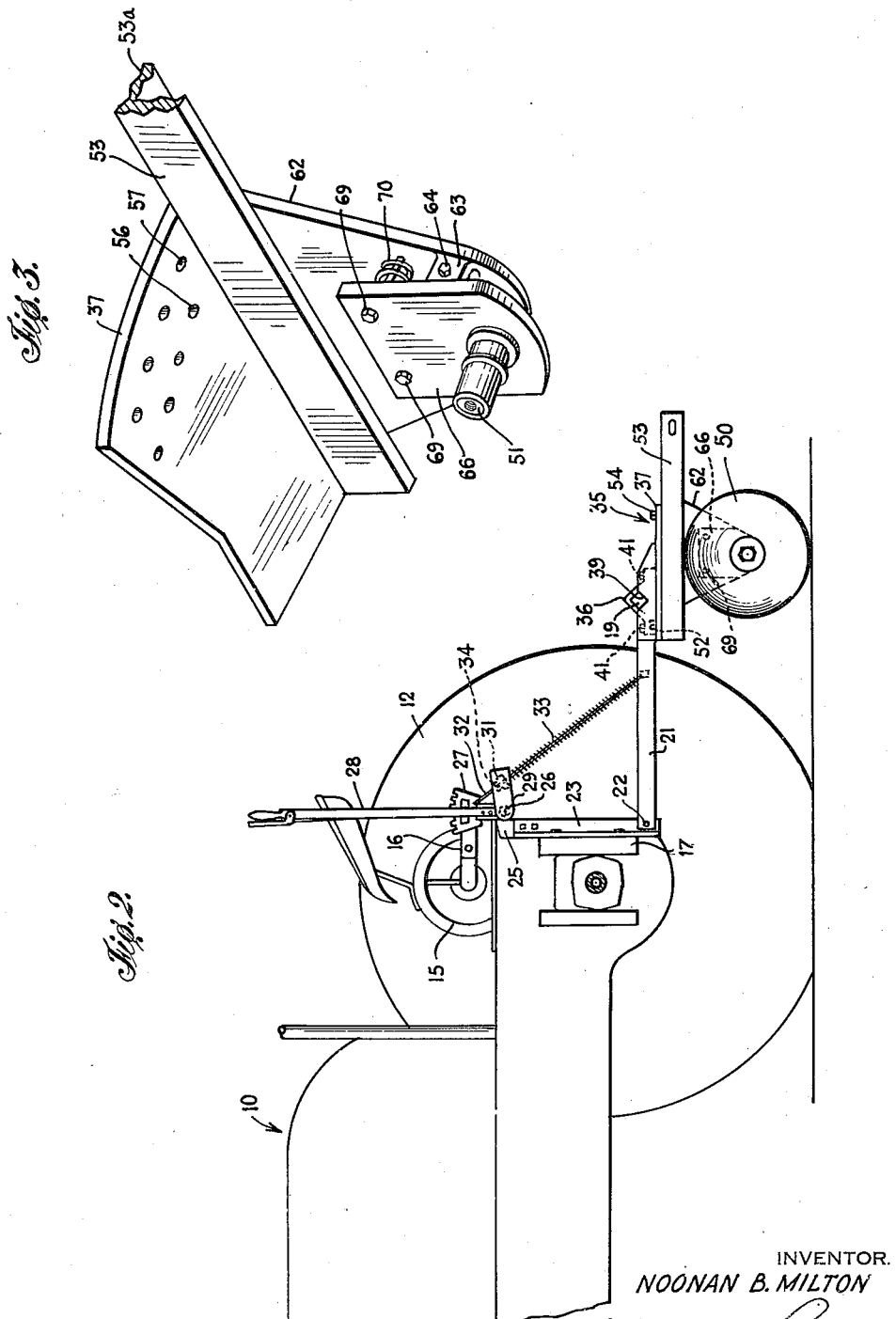
INVENTOR.
NOONAN B. MILTON
BY
ATTORNEYS.

Patented Nov. 27, 1951

2,576,351

UNITED STATES PATENT OFFICE 2,576,351

TRACTOR MOUNTED DISK CULTIVATOR

Noonan B. Milton, Fort Pierce, Fla.

Application October 27, 1947, Serial No. 782,257

5 Claims. (Cl. 97—54)

This invention relates to agricultural implements and more particularly to implements adaptable to the forming and preparing of seed beds for vegetable plants and for the cultivation of the plants. The invention is particularly adaptable to use in the formation of hills or ridges in which certain types of vegetables are grown. It is particularly useful in the cultivation of certain types of vegetables which are planted in very widely spaced rows where it is the usual practice to have the earth working elements close to the sides of the rows during the first cultivation and at progressively greater distances from the sides of the rows during the successive cultivations.

In the cultivation of certain vegetables in certain parts of the country it is quite desirable to have an earth working implement or cultivator of the disk type which can be thrown in one position to form a ridge or can be thrown in the opposite direction to throw the dirt away from such ridges. One of the main features of the present invention is the provision of a novel adjusting device whereby the disk plow can be readily positioned to effect the type of soil cultivation desired. In the present devices it is difficult to readily adjust the angle and position of the disks with the result that the ordinary unskilled operator does not get both of the disks adjusted to the same extent and improper cultivation results.

Accordingly, one of the primary objects of the present invention is to provide an implement of the type described in which the soil engaging elements may be readily adjusted, with a minimum of skill, to throw the loose dirt in the desired direction.

Another object is to provide an improved implement of the type described which will be simple, efficient and inexpensive to manufacture.

A still further object is to provide an agricultural implement having disk type soil engaging elements which may be easily and accurately adjusted as to angular position as well as to relative spacing to each other and with respect to the draw bar.

A still further object is to provide an agricultural implement having a plurality of spaced disk soil engaging elements in which the disk elements can be adjusted angularly about the vertical axes and about a horizontal axis which passes through the axis of rotation of the disk elements and can also be readily adjusted laterally with respect to each other.

Another object is to provide an agricultural implement having individual sets of disks which may be positioned laterally with respect to each other on a draw bar member and may be quickly interchanged from side to side for the purpose of changing the direction in which the disk will throw the soil, the disks or sets of disks being adjustable about vertical axes and also about a horizontal axis passing through the axis of rotation of the disks.

Other and further objects will become readily apparent from the following description when considered in connection with the accompanying drawings, illustrating an embodiment of the invention, and in which:

Figure 1 is a partial plan view showing the present invention and its manner of attachment to the tractor;

Figure 2 is a side elevation of Figure 1;

Figure 3 is a partial perspective view of one of the soil engaging elements mounted in accordance with the present invention; and Figure 4 is a partial vertical end view of Figure 1 looking toward the tractor from a point in the rear thereof.

According to the present invention, there is provided an implement having a plurality of soil engaging elements which are commonly referred to in the agricultural art as bedding tools. These tools are in the form of disks which are mounted for rotary movement on suitable frame structures, which frame structures may be adjusted laterally with respect to a tool bar which may be connected to a tractor. These bedding tools or disks are mounted on the tool bar in such a way that their angular position with respect to the line of draft of the implement can be readily changed. Also these tools are attached in such a manner that they can be readily adjusted relative to each other for cultivating the soil at different distances with respect to the rows of vegetables.

Referring particularly to Figures 1 and 2, the invention is illustrated in connection with its attachment to a tractor 10 having rear axle housings through which extends an axle on which the rear drive wheels 12 are mounted. A power lift mechanism 15 is mounted on the differential housing 14. The power lift mechanism may be of any conventional form, such as mechanically or hydraulically operated, and is provided with lever arms 16 at the opposite sides thereof through which the power lift device is connected to a tool supporting frame 18.

The rear axle housings are provided with suitable bracket structure 17 through which various types of agricultural implements may be connected thereto. The tool supporting frame 18 is connected at opposite sides thereto to the separate brackets 17. With this arrangement the draw bar means of the tractor serves as a means for carrying the tools when they are not in operation and also provides the means through which the necessary force is applied to the working tools to force them into the soil.

The tool supporting frame 18 includes a transverse tool bar 19 to which are connected forwardly extending draft members 21 pivotally connected at 23 respectively, to vertically extending members 22 which in turn are secured to the bracket structures 17. The upper ends of the vertically extending members 22 are provided with rearwardly extending plates 25 in which there is journaled a rock shaft 26 which extends laterally across the tractor. The rock shaft 26 is provided with quadrants 27 over which are respectively operated suitable adjusting levers 28 which are journaled on the rock shaft 26. The levers 28 are provided with suitably spaced bell crank arms 29 which are pivotally connected by means of trunnions 31 to the upper end of lifting rods 32. The lower ends of the lifting rods are in turn connected to the draft members 21. The lifting rods may include the usual compression springs 33 for the purpose of applying force from the weight of the tractor to the working tools to force them into the ground. The lifting of the draft members 21 and the draw bar is effected by means of a collar element 34 secured to the upper end of the lifting rods 32. The depth of the working tools and the leveling of the draw bar 19 may be effected by the relative adjustment of the levers 28 on the opposite sides of the tractor. It will be readily apparent that the rock shaft 26 may be rotated through the link connections to the arms 16 of the power lift for the purpose of lifting the tool supporting frame 18 to thereby raise and lower the implement as a unit.

The transverse tool bar 19 serves as a means to which the individual bedding tool units 35, constructed in accordance with the present invention, are connected to the tractor. One of the bedding units 35 is connected to each side of the tool bar 19 by means of suitable clamp means 36. It will be readily apparent that by loosening the clamp the individual tool units can be spaced anywhere desired on the tool bar 19 for adjusting the relative position of the tools.

The bedding tool units 35 comprise a plate member 37, the rear end of which is somewhat fan-shaped and is provided with two laterally spaced longitudinally disposed web members 38 which are suitably welded to the upper side of the plate 37. The upper edges of the webs 38 are provided with suitable V-shaped notches 39 which are adapted to engage the underside of the tool bar 19. The clamp members 36 are complementary to the V-shaped notches 39 so that they fit over the top of the square tool bar 19 so that when the nuts on the bolts 41 are run down tight, the individual tool units 35 will be rigidly held to the tool bar.

The working tools or disks 50 are mounted for rotation on spindles 51 which in turn are mounted for angular adjustment with respect to the vertical and horizontal planes, thus making the spindles adjustable about two axes at right angles to each other in a manner which will be more fully described hereinafter. To this end, the plate member 37 has pivoted thereto at 52 an L-shaped bar 53. This bar 53 is preferably made of very heavy wrought iron of sufficient thickness to withstand the stresses involved in operating the tools or disks 50. The pivotal connection between the plate 37 and the L-shaped bar 53 is in the form of a heavy bolt which engages the two members. A second bolt 54 engaging holes in plate member 37 and bar 53 is relied upon to hold the bar 53 in fixed relation with respect to the plate member 37. The plate member 37 is provided with two series of holes 56 and 57, the centers of each series being spaced respectively on separate arcs about the center of the bolt 52.

The holes in the arcuate series 56 are angularly offset with respect to the holes in arcuate series 57. By removing the bolt 54 and adjusting the angular position of the bar 53 about the bolt 52 until one of the holes of either series 56 or 57 registers with a hole in bar 53 and then inserting the bolt 54 and tightening the nut thereon the plate member 37 can be held rigidly in a desired angular relation with respect to the line of draft of the implement, thereby changing the angle of the respective tools or disks 50 to adjust their operating position. To this end, a hole 57 in the web 53a of the L-shaped bar 53 is adapted to register with the holes of the series 56 when the plate member 37 is adjusted angularly with respect to the bolt 52. Likewise, a similar hole 58 in the web 53a is adapted to register with the holes of the series 57.

A web or plate member 62 is welded to the bar 53 and depends therefrom. This web 62 is preferably made of heavy wrought iron sufficient to resist the forces involved in the operation of the disks 50 and serves as the member to which the spindles 51 of the disks are mounted. To this end the plate or web 62 is provided with suitable bosses or ears 63 welded thereto. The two ears 63 are provided with aligned holes to receive a bolt 64 which serves as the point of pivotal adjustment of the spindles 51. The spindle 51 is welded to a heavy plate 66 which has spaced ears 67 welded thereto. The ears 67 are provided with aligned holes and are so spaced that they fit between the ears 63. The bolt 64 which engages the holes in the ears 63 on the web 62, also engages the holes in the ears 67 on the plate 66 serving as the pivotal mounting for the spindle 51. Suitable bolts 69 extend through holes in the upper part of the plate 66 and engage holes in the plate 62. Suitable compression springs 70 are interposed between the plates 62 and 66 and surround the bolts 69 for the purpose of resiliently urging the upper end of the plate 66 away from the plate 62 about the pivotal axis of the bolt 64. By adjusting the nuts 71 the angular position of the spindle 51 and the disks can be readily adjusted. The compression springs 70 serve as a safety means so that in the event the disks 50 strike an obstruction in the ground, such as a rock or stump, a change of the angular position of the disk is permitted to prevent damage to the latter. It will be apparent that this resilient mounting supplements the compression spring 33 on the tractor hitch to prevent damage to the implement in the event the disk strikes obstructions in the ground. It will be readily apparent that backing off of the nuts 71 will permit the compression springs to move the upper end of the plates 66 away from the plates or webs 62 and thus throw the top of the disks 50 outwardly. It will be readily apparent that the construction described permits the ready adjustment of the axis of the spindle in either the horizontal or vertical planes so that the penetration of the disk into the soil can be controlled for the desired type of cultivation. Also, by loosening the bolts 41 of the clamp means 36, the relative lateral position of the working tool units 35 can be readily changed. If it is desired to throw the soil inwardly instead of outwardly, the units 35 can be changed end for end.

In the above description similar reference numerals have been used on both of the tool units 35 since the construction of each is identical except that one is the image of the other for right and left hand mounting, respectively.

From the above description, it will be readily apparent that the present invention provides a novel and simple adjustment for the disks of a cultivator or plow implement and it will also be noted that the invention provides a construction in which the angular position of the disk can be adjusted with respect to an axis which is transverse to and passes through the axis of the spindle on which the disk is mounted. In this way changes in the angular position of the disk can be effected without materially affecting the change of the relative vertical position of the disk with respect to the draw bar or implement carrying frame and therefore without appreciably affecting the depth of the tool. It will be readily apparent that the depth of the individual tools can be adjusted as desired entirely independent of an adjustment of the angle of the disk.

Although the invention has been described in considerable detail, it will be apparent to those skilled in the art that many variations are possible without departing from the inventive concept. It is therefore desired that the invention not be limited except insofar as is made necessary by the prior art and by the appended claims.

I claim:

1. In an agricultural implement, a transversely extending tool bar, a plurality of soil engaging tool units attached to said bar, said tool units comprising a horizontal plate member detachably fixed to said bar, a depending web member serving as a tool shank attached to said horizontal plate member, a spindle pivotally connected to said tool shank member for movement about a horizontal axis in a plane extending transversely from said web member, an extension member rigidly affixed to and extending upward from said spindle, compressible resilient means coupled between said extension member and said depending web member and means opposing said resilient means for limiting relative pivotal movement between said extension member and said web member.

2. In an agricultural implement, a transversely extending tool bar, a plurality of soil engaging tool units detachably attached to said tool bar, each of said units comprising a horizontal plate member detachably secured to said tool bar, a depending member serving as a tool shank pivotally connected to said plate-like member for pivotal movement about a generally vertical axis, a series of spaced holes in said plate-like member placed on an arc about said pivotal axis, a hole in said tool shank member adapted to register with said holes in said plate-like member when said tool shank is moved about the pivotal axis whereby a bolt or similar element may engage registering holes in both of said members to secure said tool shank in fixed angular position relative to said plate-like member, a second web member generally parallel to said depending web member, a pivotal connection between the lower end of said depending web member and said second web member, a spindle extending transversely from said second web member near said pivotal connection, compressible resilient means between a point on said second web member spaced from said pivotal connection and said depending web member and means opposing said resilient means for limiting relative pivotal movement between said web members in the opposite direction.

3. In an agricultural implement, a transversely extending tool bar, a plurality of soil engaging tool units attached to said tool bar, each of said units comprising a horizontal plate-like member, an L-shaped bar pivotally connected to said plate-like member at one point and means at another point on said bar for connecting the latter at selected points on said horizontal plate-like member, a depending web member connected to said bar and serving as a tool shank, a plurality of spaced ears on said web member, a second web member having a plurality of ears projecting from one side thereof, means such as a bolt for engaging holes in the respective ears on said web members to serve as a pivotal connection, a spindle extending transversely from second web member, a soil engaging disk tool mounted for rotation on said spindle and means for varying the angular position of said web members.

4. In an agricultural implement, a transversely extending tool bar, a plurality of soil engaging tool units attached to said tool bar, each of said units comprising a horizontal plate member detachably secured to said tool bar, a depending web member serving as a tool shank pivotally connected to said plate for pivotal movement about a generally vertical axis, a second web member generally parallel to said first web member, a pivotal connection between the lower end of said first web member and said second web member, a spindle extending transversely from said second member near said pivotal connection, compressible resilient means between a point on said second web member spaced from said pivotal connection and said first web member and means opposing said resilient means for limiting relative pivotal movement between said web members in the opposite direction.

5. In an agricultural implement, a transversely extending tool bar, a plurality of soil engaging tool units attached to said tool bar, each of said units comprising a horizontal plate member detachably secured to said tool bar, a depending web member serving as a tool shank pivotally connected to said plate for pivotal movement about a generally vertical axis, a second web member generally parallel to said first web member, a pivotal connection between the lower end of said first web member and said second web member, a spindle extending transversely from said second member near said pivotal connection, resilient means for urging relative pivotal movement between said web members in one direction and means for limiting said pivotal movement, said latter means serving to adjust the angular position of said spindle with respect to said first web member.

NOONAN B. MILTON.

REFERENCES CITED

The following references are of record in the file of this patent:

UNITED STATES PATENTS

| Number | Name | Date |
| --- | --- | --- |
| 542,470 | Freiburghouse | July 9, 1895 |
| 926,063 | Helmlinger | June 22, 1909 |
| 1,054,404 | Friberg | Feb. 25, 1913 |
| 1,499,536 | Kelly | July 1, 1924 |
| 2,140,144 | Silver | Dec. 13, 1938 |
| 2,344,301 | Hand | Mar. 14, 1944 |
| 2,430,732 | Orelind et al. | Nov. 11, 1947 |